United States Patent [19]

Storace et al.

[11] 4,037,675
[45] July 26, 1977

[54] LEAF SPRING WEIGHING SCALE

[75] Inventors: Anthony Storace, Tarrytown, N.Y.; Paul R. Sette, Hamden, Conn.

[73] Assignee: Pitney-Bowes, Inc., Stamford, Conn.

[21] Appl. No.: 680,155

[22] Filed: Apr. 26, 1976

[51] Int. Cl.$^2$ .............................................. G01G 3/08
[52] U.S. Cl. ............................... 177/229; 177/DIG. 9
[58] Field of Search ........................ 177/225, 229, 255

[56] References Cited

U.S. PATENT DOCUMENTS

| 2,703,980 | 3/1955 | Tell ................................... 177/225 X |
| 2,802,660 | 8/1957 | Williams, Jr. ......................... 177/255 |
| 3,667,560 | 6/1972 | Cooke ............................... 177/229 X |
| 3,869,007 | 3/1975 | Haggstrom et al. ............. 177/255 X |
| 3,891,041 | 6/1975 | Hall et al. ............................ 177/255 |

FOREIGN PATENT DOCUMENTS 1,387,626   3/1975   United Kingdom ................. 177/229

Primary Examiner—George H. Miller, Jr.
Attorney, Agent, or Firm—Robert S. Salzman; William D. Soltow, Jr.; Albert W. Scribner

[57] ABSTRACT

A leaf spring weighing scale is described which uses load cells to measure the deflection of the load support. The load cells are arranged in tandem. One of the load cells is a low range deflection reading cell, and the other load cell is a high range measuring cell. Each of the load cells is bottomed before it reaches its deflection limit to prevent damage to the cell. A point contact connection between the load support and the load cells eliminates errors caused by lateral forces, and errors due to the non-linearities in the load support deflection. The leaf springs of the scale are constructed as thin strips to eliminate the effects of "oil canning", and to reduce structural and assembly inaccuracies.

10 Claims, 5 Drawing Figures

4,037,675

LEAF SPRING WEIGHING SCALE

This invention pertains to a leaf spring weighing scale, and more particularly to a leaf spring scale having a tandem load cell deflection measuring apparatus.

BACKGROUND OF THE INVENTION

A problem with using load cells in weighing scales is their sensitivity to applied moments. These moments result from the non-linearities in the deflection of the load support, and from shifts of the load upon the pan. Conventional solutions to this problem generally feature three or more load cells, and the averaging of the load cell readings to cancel the effects of the moments. Another solution features the use of a balance beam mechanism and knife edge supports. Both of these solutions are complicated and expensive.

When leaf springs are used as part of the load support structure of a scale, non-linearities in the load support deflection may also introduce applied moments to the load cells, thus causing inaccuracies. In addition, the leaf springs also may exhibit a condition referred to as "oil canning". Oil canning is a localized bulging that may occur in the thin flat leaf spring material due to inconsistencies of manufacture and assembly. This bulging will also introduce errors into the weight determination.

The subject invention has provided a highly accurate weighing scale by combining a pair of twin leaf springs, and a pair of load cells. The invention, however, is not limited by the aforementioned disadvantages.

SUMMARY OF THE INVENTION

The invention relates to a leaf spring weighing scale. The scale comprises a weighing pan for receiving a load, and which is movably responsive to the load. A movable load support structure supports the weighing pan. The load support comprises a pair of upper and lower spaced apart leaf spring strips, which form a parallelogram. This parallelogram structure provides a substantially linear load support and pan movement. This near linear movement is useful in providing accurate weight determinations.

A pair of load cells support the load support, and measure its deflection. The load cells are arranged in tandem, with one load cell being operative through a given portion of the weight range, and the other being operative through the remaining portion of the weight range.

The load support and the load cells are operatively interconnected by means of a point contact connection. This connection includes a ball in contact with a substantially flat surfaced anvil member. This point contact connection all but eliminates the effects of load shifting upon the pan, and non-linearities in the deflection of the load support.

The load cells are bottomed before they reach their maximum deflection to prevent their damage.

An adjustment spring is used to partially support the load support and pan so that the load cell weight sensing range can be increased.

The leaf springs of the load support are constructed as thin, flat strips. This eliminates problems in the accuracy of construction, manufacture, and assembly, and the problem of "oil canning" (localized bulging).

In addition, errors due to temperature effects upon the spring material are substantially eliminated with the use of this leaf spring and load cell combination. This is so, because the spring constant of the leaf springs is only 1% (one percent) of the load cell spring constant. Thus, changes in the thermo-elastic coefficient (elastic modulus) of the spring material are negligible, because the load cells are the principal load bearing members.

It is an object of this invention to provide an improved leaf spring weighing scale;

It is another object of the invention to provide a highly accurate leaf spring weighing scale that is insensitive to load shifting and non-linearities in load support deflection;

It is still another object of this invention to provide a leaf spring weighing scale that is insensitive to temperature effects;

It is a further object of the invention to provide a novel leaf spring and load cell combination for a weighing scale.

These and other objects of this invention will be better understood and will become more apparent with reference to the following detailed description taken in conjuncton with the attached drawings in which.

Figure 1:
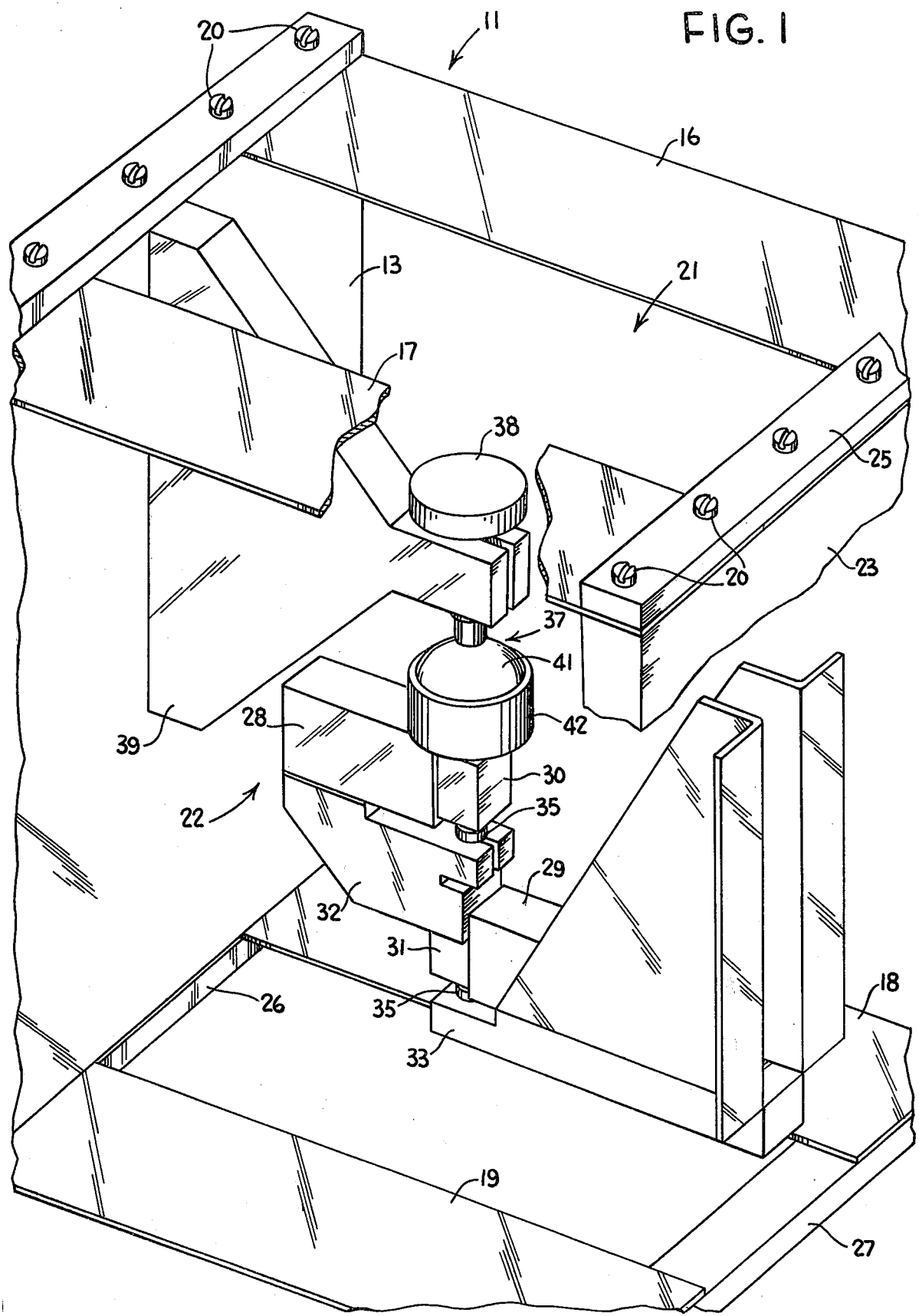
FIG. 1 is a perspective partial view of the leaf spring weighing scale of this invention.
Figure 2:
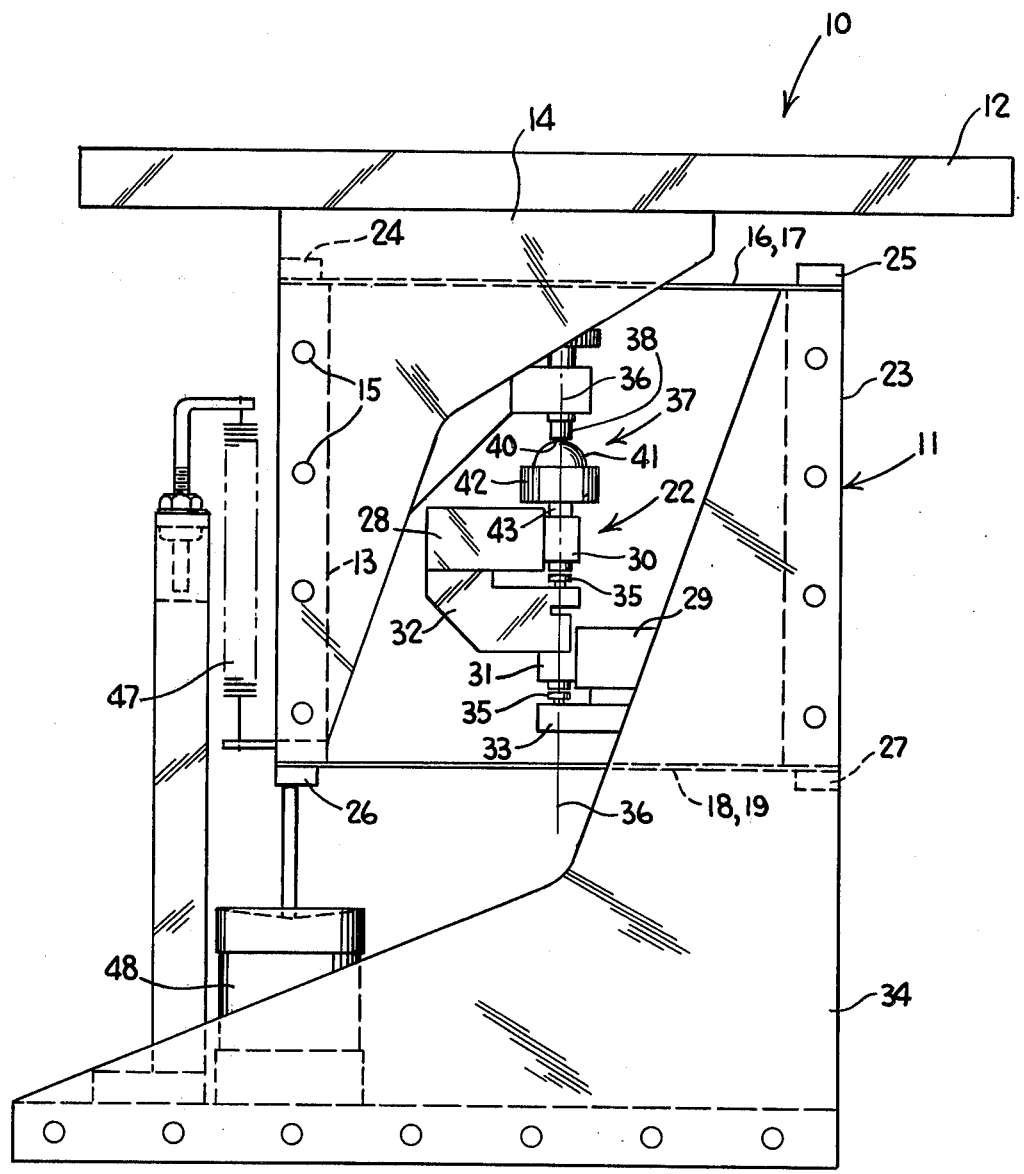
FIG. 2 is a side view of the weighing scale of FIG. 1.

Now referring to FIG. 2, the weighing scale 10 of this invention is shown. The leaf springs and load cells of the scale is generally shown by arrow 11 and is illustrated in a more detailed perspective view in FIG. 1.

The weighing scale 10 comprises a pan 12 upon which a load or weight is placed. The pan 12 is rigidly connected to the movable load support frame member 13 via flange members 14 (one on each side of frame 13). The flange members 14 are screwed to the sides of the frame 13 by screws 15.

The load support of the scale is comprised of two frame members 13 and 23 which are united by two pairs of leaf spring strips 16, 17 and 18, 19 (FIG. 1). The leaf spring strips are anchored to the frame members 13 and 23 by elongated blocks 24, 25 and 26, 27. The elongated blocks are screwed to the frame members 13 and 23 via screws 20 (FIG. 1).

The load support is comprised of four narrow leaf spring strips rather than the usual two leaf spring plates. This arrangement has several advantages:

A. it eliminates or reduces "oil canning" (localized bulging) usually inherent in long and wide plates;

B. it provides easier assembly, since alignment and dimensions are more easily adjusted and maintained;

C. the space 21 that is available between the strips allows for easier access to the inner load cell apparatus 22;

D. the load cell apparatus 22 may be constructed to project through space 21, allowing for a more compact load support; and E. the strips make for a lighter load support, and require less material for load support manufacture.

The load cell apparatus 22 includes two load cells 28 and 29 arranged in tandem. Each of the load cells has a load bearing end 30 and 31, respectively. Each load bearing end 30 and 31 deflects under the load placed upon the pan 12. Support member 32 supports load cell 28 at one end thereof, and rests upon the load bearing end 31 of load cell 29 at its other end. Support member 33 supports the load cell 29. The support member 33 is carried by the load support frame member 23, which in turn is carried by the scale frame 34.

Each load cell support member 32 and 33, respectively, provides a bottoming pad 35 for its respective load cell. The bottoming pads 35 limit the deflection of the load cells, such that the load cells will no exceed their load carrying maximum. This prevents damage to the load cells.

The load on pan 12 is always applied along load axis 36 (FIG. 2), no matter how the load may shift on the pan. This is also true despite any non-linearities (lateral movement) in the deflection of the load support. This axial loading is accomplished by means of the point contact connection 37. This connection comprises an anvil 38, which is fixed to the load support frame member 13 via flange 39. The anvil 38 has a flat surface 40 at its lower end as shown in greater detail in FIG. 3.

Figure 3:
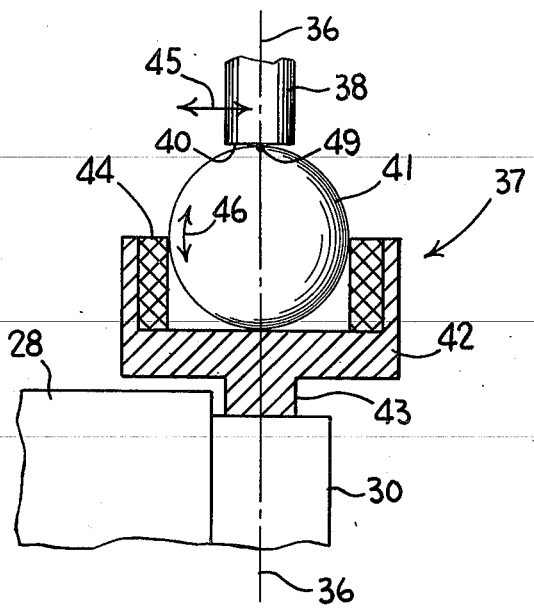
FIG. 3 is a sectional view of the point contact support disposed between the tare and the load cells of the weighing scale shown in FIGS. 1 and 2.

The flat surface 40 of the anvil 38 rests upon a ball 41, which is free to turn within a cylindrical housing 42. The flat surface 40 of the anvil 38 makes point contact with the ball 41 about point 49 (FIG. 3). The ball retaining housing 42 has a lower foot 43, that rests upon the load bearing end of load cell 28.

The ball 41, is free to turn within housing 42 by means of an internal flexible collar 44 (FIG. 3). The flexible collar 44 may be made of any material providing a low lateral stiffness, such as a foam, a soft rubber, etc.

When the anvil is caused to laterally move (arrows 45; FIG. 3), the contact point 49 will never shift from the load axis 36. This is so, because the ball 41 will turn (arrows 46) to accommodate the lateral shift of anvil member 38. Thus, the load cells 28 and 29 will never be subjected to error producing side loads.

A tension spring 47 as depicted in FIG. 2 is connected between the scale frame 34 and the movable load support frame 13. This spring is an adjustment for the initial load experienced by the load cells.

A damping unit 48 is also connected to the movable end of the load support to reduce vibrational and oscillatory effects.

OPERATION OF THE INVENTION

The operation of this inventive leaf spring scale will be described with additional reference to FIGS. 4 and 5.

Figure 4:
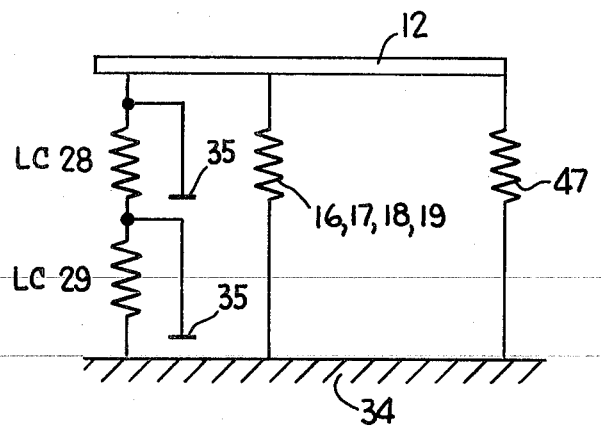
FIG. 4 is a schematic diagram of the weighing scale of FIGS. 1 and 2.

FIGS. 4 illustrates a schematic diagram of the scale system of the invention. Load cells 28 and 29 are depicted as load bearing spring members arranged in series. Bottoming members 35 are shown as limiting the movement of the load springs 28 and 29, respectively. Leaf springs 16, 17, 18 and 19 and adjustment spring 47 are arranged in parallel with load springs 28 and 29 so support the pan 12. The spring constants for the load springs 28 and 29 are respectively on the order of 100 times stiffer than the other aprings. Therefore, any thermal changes in the leaf or adjustment spring (changes in elastic modulus) are negligible (1%). This arrangement will provide a scale of high accuracy.

Furthermore, the aforementioned point contact connecton 37 reduces errors due to load side shifts and non-linearities, which also provides for a highly accurate scale.

Leaf springs 16, 17, 18 and 19 are constructed as thin strips to reduce other manufacturing and dimensional inaccuracies.

Figure 5:
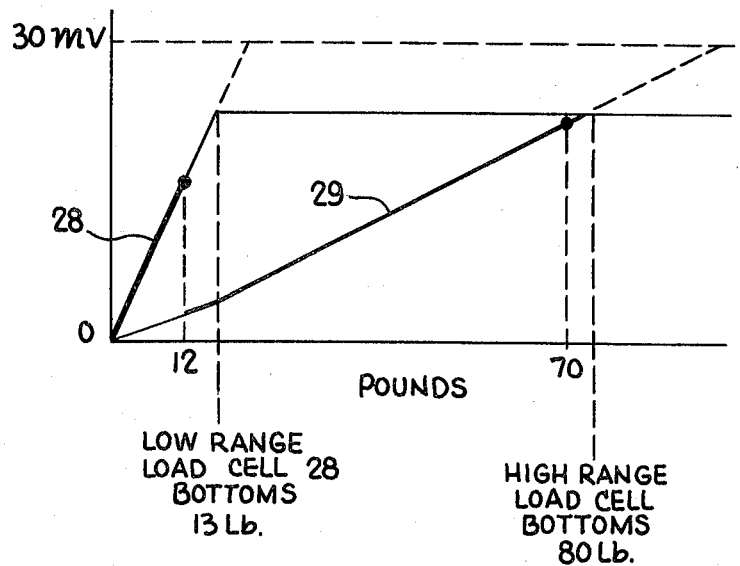
FIG. 5 is a graphic view of the load cells' performance (load cell output versus weight) as expressed in milli-volts versus pounds.

FIG. 5 shows a graph of load cell outputs in millivolts versus the load applied to the pan 12 in pounds. Load cell 28 is operative over a lower range (zero to fifteen pounds) than load cell 29. Readings are taken from load cell 28 (dark line) over the range of zero through twelve pounds. At that point, the measuring apparatus (not shown) switches to monitoring the output from load cell 29 (dark line). When load cell 28 bottoms at a load of thirteen pounds, the slope of the output of load cell 29 will change as shown. Load cell 29 will bottom when a load of eighty pounds is reached.

It wil be evident from the foregoing discussion, that the objects of the invention have been achieved.

It will be obvious to those skilled in this art, that many changes and differences in design can be wrought without departing from the spirit and scope of this invention. Therefore, it is deemed that all such obvious changes fall within the limits of the invention as presented by the appended claims.

What is claimed is:

1. A leaf spring weighing scale, comprising:
   a weighing pan for receiving a load and which is movable, through a weighing range in response to said load;
   a support means;
   a movable load support structure supporting said weighing pan for movement, and disposed between the support means and said pan, said load support structure including a pair of upper and lower spaced-apart leaf spring strips so arranged so as to form a parallelogram for providing a substantially linear load support and pan movement;
   a first and a second deflection sensing load cell, said first and second load cels arranged in tandem, and operatively connected to said load support structure, said first first load cell being operative through a given portion of said weighing range, and said second load cell being operative through a remaining portion of said weighing range; and
   interconnecting means operatively connecting said load support structure to said first and second load cells, said interconnecting means including a point contact connection disposed between said load support structure and said first and second load cells, said point contact connection having a ball in contact with a substantially flat surfaced anvil member, said point contact connection being operative to minimize load cell sensing errors introduced by any nonlinearities in the load support and pan movement.

2. The leaf spring weighing scale of claim 1, wherein said ball of said point contact connection is movably housed in a flexible retaining means for allowing the ball to freely roll.

3. The leaf spring weighing scale of claim 1, further comprising a bottoming means disposed between said first load cell and said second load cell for limiting the movement of said first load cell prior to its reaching a maximum deflection.

4. The leaf spring weighing scale of claim 1, further comprising a bottoming means disposed between said second load cell and said support means for limiting the movement of said second load cell prior to the second load cell reaching its maximum deflection.

5. The leaf spring weighing scale of claim 1, further comprising an adjustment spring connected between said support means and said load support structure for diminishing the load of said load support structure and said pan, which is supported by said point contact connection and said load cells.

6. A weighing scale, comprising:
- a weighing pan for receiving a load and which is movable through a weighing range in response to said load;
- a support means;
- a movable load support structure supporting said weighing pan for movement, and disposed between the support means and said pan, said load support structure providing a substantially linear load support and pan movement;
- a first and a second deflection sensing load cell, said first and second load cells arranged in tandem, and operatively connected to said load support structure, said first load cell being operative through a given portion of said weighing range, and said second load cell being operative through a remaining portion of said weighing range; and
- interconnecting means operatively connecting said load support structure to said first and second load cells, said interconnecting means including a point contact connection disposed between said load support structure and said first and second load cells, said point contact connection having a ball in contact with a substantially flat surfaced anvil member, said point contact connection being operative to minimize load cell sensing errors introduced by any non-linearities in the load support and pan movement.

7. The weighing scale of claim 6, wherein said ball of said point contact connection is movably housed in a flexible retaining means for allowing the ball to roll freely.

8. The weighing scale of claim 6, further comprising a bottoming means disposed between said first load cell and second load cell for limiting the movement of said first load cell prior to its reaching a maximum deflection.

9. The weighing scale of claim 6, further comprising a bottoming means disposed between said second load cell and said support means for limiting the movement of said second load cell prior to the second load cell reaching its maximum deflection.

10. The weighing scale of claim 6, further comprising an adjustment spring connected between said support means and said load support structure for diminishing the load of said load support structure and said pan, which is supported by said point contact connection and said load cells.

* * * * *

UNITED STATES PATENT AND TRADEMARK OFFICE
CERTIFICATE OF CORRECTION

PATENT NO. : 4,037,675
DATED : July 26, 1977
INVENTOR(S) : Anthony Storace - Paul R. Sette It is certified that error appears in the above-identified patent and that said Letters Patent are hereby corrected as shown below:

Column 3, line 11, change "no" to -- not --.

Column 3, line 61, change "aprings" to -- springs --.

Column 4, line 15, change "wil" to -- will --.

Claim 1, Column 4, line 37, change "cels" to -- cells --.

Claim 1, Column 4, line 39, remove second occurrence of "first".

Signed and Sealed this

Fourth Day of July 1978

[SEAL]

Attest:

RUTH C. MASON
Attesting Officer

DONALD W. BANNER
Commissioner of Patents and Trademarks